US005843259A

United States Patent [19]

Narang et al.

[11] Patent Number: 5,843,259

[45] Date of Patent: Dec. 1, 1998

[54] METHOD FOR APPLYING AN ADHESIVE LAYER TO A SUBSTRATE SURFACE

[75] Inventors: Ram S. Narang, Fairport, N.Y.; Stephen F. Pond, Gainesville, Va.; Timothy J. Fuller, Pittsford, N.Y.

[73] Assignee: Xerox Corporation, Stamford, Conn.

[21] Appl. No.: 703,138

[22] Filed: Aug. 29, 1996

[51] Int. Cl.[6] ........ B32B 31/12

[52] U.S. Cl. ........ 156/151; 156/250; 156/273.9; 156/275.7; 204/489; 427/469

[58] Field of Search ........ 156/150, 151, 156/250, 273.9, 274.4, 275.7; 346/63, 68; 204/489, 492, 493, 507; 427/469

[56] References Cited

U.S. PATENT DOCUMENTS

| | | | |
|---|---|---|---|
| Re. 32,572 | 1/1988 | Hawkins et al. | 156/626 |
| 4,391,933 | 7/1983 | Scala et al. | 523/454 |
| 4,678,529 | 7/1987 | Drake et al. | 156/234 |
| 4,844,784 | 7/1989 | Suzuki et al. | 156/151 |
| 5,336,319 | 8/1994 | Narang et al. | 118/211 |

*Primary Examiner*—Michael W. Ball
*Assistant Examiner*—Michael A. Tolin

[57] ABSTRACT

A method is described for uniformly coating portions of the surface of a substrate which is to be bonded to another substrate. In a described embodiment, the two substrates are channel plates and heater plates which, when bonded together, form a thermal ink jet printhead. The adhesive layer is electrophoretically deposited over a conductive pattern which has been formed on the binding substrate surface. The conductive pattern forms an electrode and is placed in an electrophoretic bath comprising a colloidal emulsion of a preselected polymer adhesive. The other electrode is a metal container in which the solution is placed or a conductive mesh placed within the container. The electrodes are connected across a voltage source and a field is applied. The substrate is placed in contact with the solution, and a small current flow is carefully controlled to create an extremely uniform thin deposition of charged adhesive micelles on the surface of the conductive pattern. The substrate is then removed and can be bonded to a second substrate and cured.

5 Claims, 5 Drawing Sheets

METHOD FOR APPLYING AN ADHESIVE LAYER TO A SUBSTRATE SURFACE

BACKGROUND OF THE INVENTION AND MATERIAL DISCLOSURE STATEMENT

The present invention relates to a method for applying a uniform adhesive coating on a substrate for subsequent bonding of the substrate, and more particularly, to depositing an adhesive coating on surfaces of a channel plate which is to be bonded to a heater plate to form a thermal ink jet printhead.

There are two general configurations for thermal drop-on-demand ink jet printheads. In one configuration, droplets are propelled from nozzles in a direction parallel to the flow of ink in ink channels and parallel to the surface of the bubble-generating heating elements of the printhead, such as, for example, the printhead configuration disclosed in U.S. Pat. No. Re. 32,572, the disclosure of which is totally incorporated herein by reference. This configuration is sometimes referred to as an edge shooter or a side shooter. The other thermal ink jet configuration propels droplets from nozzles in a direction normal to the surface of the bubble-generating heating elements, such as, for example, the printhead disclosed in U.S. Pat. No. 4,568,953, the disclosure of which is totally incorporated herein by reference. This configuration is sometimes referred to as a roofshooter. A fundamental difference between the two configurations lies in the direction of droplet ejection, in that the side shooter configuration ejects droplets in the plane of the substrate having the heating elements, whereas the roofshooter ejects droplets out of the plane of the substrate having the heating elements and in a direction normal thereto.

Various prior art methods are known to bond together components such as ink jet printhead component parts.

U.S. Pat. No. 4,678,529 to Drake et al discloses a method of bonding ink jet printhead components together by spin coating or spraying a relatively thin, uniform layer of adhesive on a flexible substrate and then manually placing the flexible substrate surface with the adhesive layer against a printhead component surface. A uniform pressure and temperature is applied to ensure adhesive contact with all coplanar surface portions and then the flexible substrate peeled away, leaving a uniformly thin coating on the surfaces to be bonded. A roller or vacuum lamination may be applied to the flexible substrate to insure contact on all of the lands or coplanar surfaces of the printhead part.

U.S. Pat. No. 5,336,319 to Narang et al. discloses an apparatus for uniformly coating a planar substrate with an adhesive layer which has a rotatably mounted sleeve with closed ends to form an internal cavity therein. The sleeve has a plurality of holes therein and its outer surface is covered by a porous layer such as a foam layer. A vacuum is applied to the sleeve cavity, while the sleeve is rotated. One surface of a polymeric film is positioned on the porous layer and held in place by the vacuum acting through the sleeve holes and porous layer. The other surface of the polymeric film contains a uniform adhesive coating. The surface of a planar substrate is tangentially transported past the polymeric film surface with the adhesive layer and in timed registration therewith, so that a nip is formed between the planar substrate and the polymeric film which transfers a uniformly thick portion of adhesive to the planar substrate surface.

These, and other similar methods, can be characterized as mechanical transfer techniques and have the disadvantage of leaving excessive amounts of the binding adhesive near the edges of the bonding areas. The extra adhesive around the edges has a tendency to flow into adjacent functional areas; e.g., into ink channels when one of the parts being bonded is an ink channel plate. A further disadvantage is the non-uniformity of the adhesive layer due to inherent variations in the transfer process; e.g., uneven pressure in the nip contact areas; improper cleaning of the transferring mechanism (roller), etc.

Other prior art references disclosing electrophoretic deposition of organic material workpieces are:

U.S. Pat. No. 4,391,933 (Scala et al.), the disclosure of which is incorporated herein by reference, discloses an emulsion which comprises about 8 to about 20 percent of a solvent, about 0.5 to 5 percent of an epoxy resin dissolved in the solvent to form a discontinuous phase, about 75 to about 90 percent of a precipitant as the continuous phase, and an emulsifier in an amount sufficient to react stoichiometrically with the epoxy and hydroxyl groups on the epoxy resin up to about 900% in excess of stoichiometric. A conductive workpiece is placed in the emulsion about ½ to about 2 inches from an electrode which is also immersed in the emulsion. A direct electric current potential is applied between the workpiece and the electrode with the workpiece as the anode. About 50 to about 400 volts and about 2 to about 50 milliamperes are used until a coating of the desired thickness has been deposited on the workpiece. The solvent and precipitant are preferably ketones such as cyclohexanone, and methylethylketone or isobutylketone, respectively. The epoxy resin is preferably a bisphenol A epoxy resin having an average molecular weight of about 2000 to about 15,000. The emulsifier is preferably an amine.

U.S. Pat. No. 4,642,170 discloses a method of electrophoretically depositing a coating of polysulfones or polyethersulfones on a conductive substrate. An amine-free solution is formed in an organic solvent of the polysulfones or polyethersulfones. An emulsion is formed by combining the solution with an organic non-solvent for the polymer which contains up to about 0.6 parts by weight of an organic nitrogen containing base per parts by weight of the polymer. A direct current is applied between a conductive substrate and the emulsion which results in the deposition of the polymer on the substrate. The disclosure of this patent is hereby incorporated by reference.

Copending application U.S. Ser. No. 08/705,916, entitled "STABILIZED GRAPHITE SUBSTRATES," filed concurrently herewith, with the named inventors Ram S. Narang and Timothy J. Fuller, the disclosure of which is totally incorporated herein by reference, discloses an apparatus which comprises at least one semiconductor chip mounted on a substrate, said substrate comprising a graphite member having electrophoretically deposited thereon a coating of a polymeric material. In one embodiment, the semiconductor chips are thermal ink jet printhead subunits.

Copending application U.S. Ser. No. 08/697,750, entitled "ELECTROPHORETICALLY DEPOSITED COATING FOR THE FRONT FACE OF AN INK JET PRINTHEAD," filed concurrently herewith, with the named inventors Ram S. Narang, Stephen F. Pond, and Timothy J. Fuller, the disclosure of which is totally incorporated herein by reference, discloses an electrophoretic deposition technique for improving the hydrophobicity of a metal surface, in one embodiment, the front face of a thermal ink jet printhead. In one example, a thin metal layer is first deposited on the printhead front face. The front face is then lowered into a colloidal bath formed by a fluorocarbon-doped organic system dissolved in a solvent and then dispersed in a non-solvent. An electric field is created and a small amount of current through the bath causes negatively charged particles to be deposited on the surface of the metal coating. By controlling the deposition time and current strength, a very uniform coating of the fluorocarbon compound is formed on the metal coating. The electrophoretic coating process is conducted at room temperature and enables a precisely controlled deposition which is limited only to the front face without intrusion into the front face orifices.

Copending application U.S. Ser. No. 08/705,914, entitled "THERMAL INK JET PRINTHEAD WITH INK RESISTANT HEAT SINK COATING," filed concurrently herewith, with the named inventors Ram S. Narang and Timothy J. Fuller, the disclosure of which is totally incorporated herein by reference, discloses a heat sink for a thermal ink jet printhead having improved resistance to the corrosive effects of ink by coating the surface of the heat sink with an ink resistant film formed by electrophoretically depositing a polymeric material on the heat sink surface. In one described embodiment, a thermal ink jet printer is formed by bonding together a channel plate and a heater plate. Resistors and electrical connections are formed in the surface of the heater plate. The heater plate is bonded to a heat sink comprising a zinc substrate having an electrophoretically deposited polymeric film coating. The film coating provides resistance to the corrosion of higher pH inks. In another embodiment, the coating has conductive fillers dispersed therethrough to enhance the thermal conductivity of the heat sink.

SUMMARY OF THE INVENTION

It is, therefore, an object of the present invention to provide a method for improving the bonding together of substrates used particularly in the assembly of ink jet printheads.

It is a further object to form an extremely uniform adhesive coating on a substrate surface to be bonded.

It is another object to form an adhesive coating of very precise geometry whose edges are controlled so as to prevent adhesive migration, or flow, into areas adjacent to the binding area It is a still further object to enable a bonding to be accomplished with an extended variety of adhesives.

These, and other objects of the invention, are realized by electrophoretically depositing an adhesive on selected areas of a substrate. The substrate to be bonded is processed during a fabrication technique which leaves portions of the substrate surfaces with a previously deposited exposed metal layer. The exposed metal can be etched away at the edges leaving only an unexposed metal layer in the center of those areas to which the adhesive is to be applied. All of the unexposed metal layer strips are connected via a common. The substrate is placed in an electrophoretic bath. The bath comprises a polymeric adhesive formed as a colloidal emulsion. In one example, using epoxy resin, the cathode is the container itself while the anode is a commonly connected metal pattern formed on the substrate surface. These two electrodes are then placed under the influence of an applied electrical field and negatively charged micelles of the adhesive solution are deposited on the anode. By controlling the parameters of the field and the electrocoating parameters, a very uniform coating of adhesive is deposited only in the precise areas of the metal conductive layer. Thus, there is no adhesive flow into areas adjacent the metal layer. In principle, any polymeric adhesive which forms an electrocoating colloidal emulsion can be used.

More particularly, the present invention relates to a method for electrophoretic deposition of an adhesive coating to the surface of a first substrate to be bonded to the surface of a second substrate, comprising the steps of:

(a) forming a conductive layer on the surface of said first substrate, said layer comprising a first electrode, (b) forming a solution comprising colloidal particles of a polymer adhesive, (c) introducing said first electrode into the solution, (d) placing a second electrode in contact within said solution, (e) applying an electrical field across said first and second electrodes, (e) allowing a uniform adhesive coating of charged micelles of adhesive to be deposited on the conductive layer of said first substrate to a desired thickness, (f) removing the substrate from the solution and (g) bonding the first and second substrates, the bonding accomplished at the adhesive coating.

DESCRIPTION OF THE INVENTION

The adhesive deposition technique of the present invention, can be used for a variety of bonding purposes. In one preferred embodiment, an adhesive coating is formed on areas of a silicon wafer which is used to produce a plurality of channel plates or substrates which are subsequently bonded to heater plates or substrates to form a thermal ink jet printhead. The printhead is formed, generally by the techniques disclosed in U.S. Pat. No. Re. 32,572, whose contents are hereby incorporated by reference. The techniques described in that patent which are used to process the channel silicon wafer; specifically, to form suitable surface areas to which adhesive is to be applied, are modified by the methods described below to provide an improved method for applying the bonding adhesive to the predetermined substrate surface areas.

Figure 1:
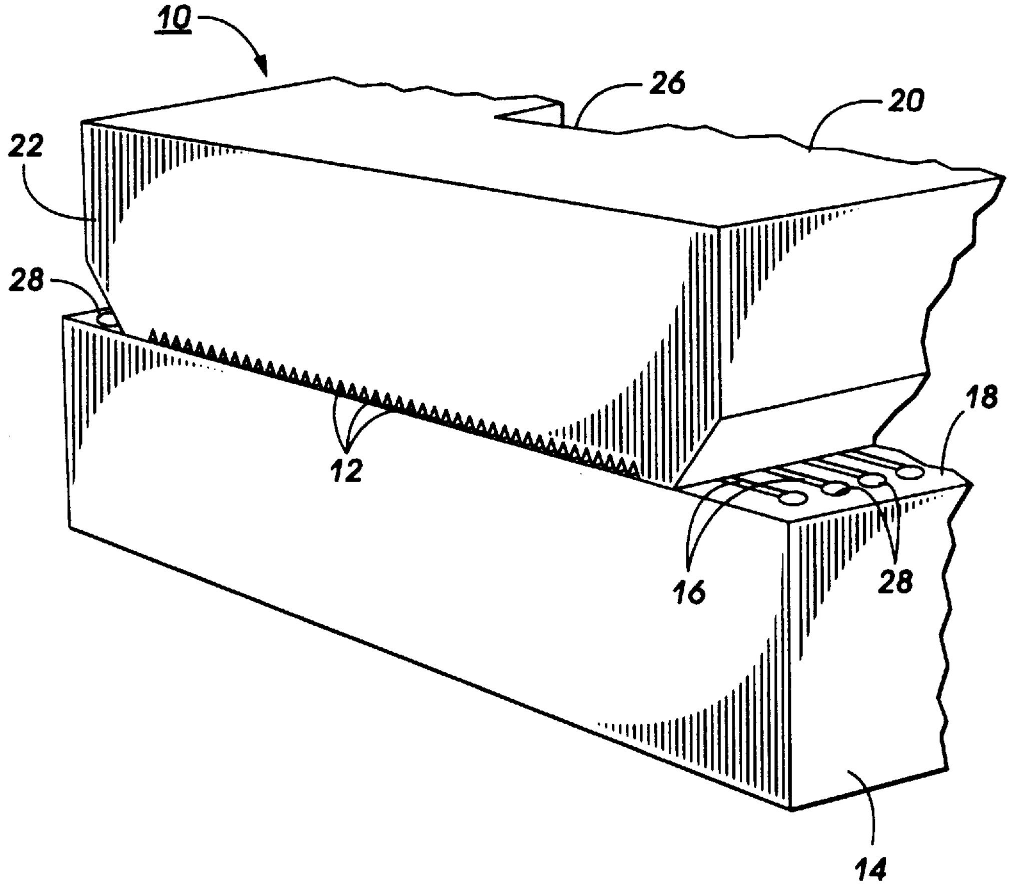
FIG. 1 is an enlarged isometric view of a printhead formed by bonding of a heater substrate to a channel substrate.

FIG. 1 is an enlarged schematic isometric view of the front face of a printhead 10 showing an array of droplet emitting nozzles 12. The lower electrically insulated substrate 14 has heating elements (not shown) and addressing electrodes 16 patterned on the surface 18 thereof, while the upper substrate 20 has parallel triangular cross-sectional grooves which extend in one direction and penetrate through the upper substrate front edge 22. The other end of the grooves communicate with a common internal recess not shown. The floor of the internal recess has an opening therethrough for use as an ink fill hole 26. The surface of the upper substrate with the grooves are aligned and bonded to the lower substrate 14 as described later, so that a respective one of the plurality of heating elements is positioned in each channel, formed by the grooves and the lower substrate. Ink enters the manifold formed by the recess and the lower substrate through the fill hole and, by capillary action, fills the channels. The ink at each nozzle forms a meniscus, the surface tension of which prevents the ink from weeping therefrom. The addressing electrodes 16 on the lower substrate 14 terminate at terminals 28.

Figure 2A:
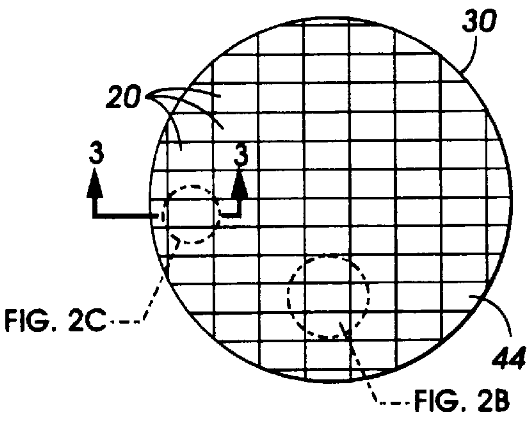
FIG. 2A is a schematic plane view of a wafer having a plurality of ink manifold recesses.
Figure 2B:
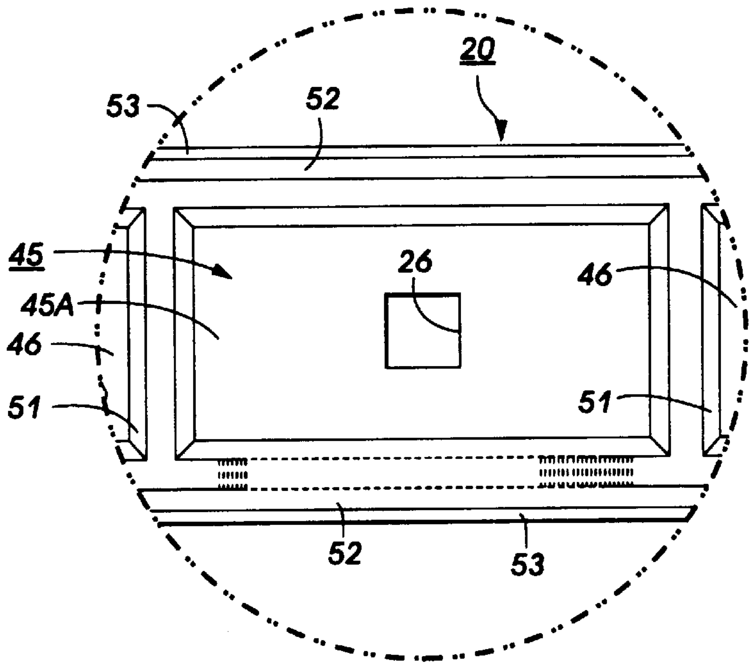
FIG. 2B is an enlarged view of one of the manifold recesses of the wafer of FIG. 2A.
Figure 2C:
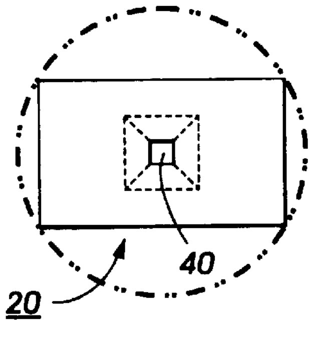
FIG. 2C is an enlarged view of an alignment opening of the wafer of FIG. 2A.
Figure 3:
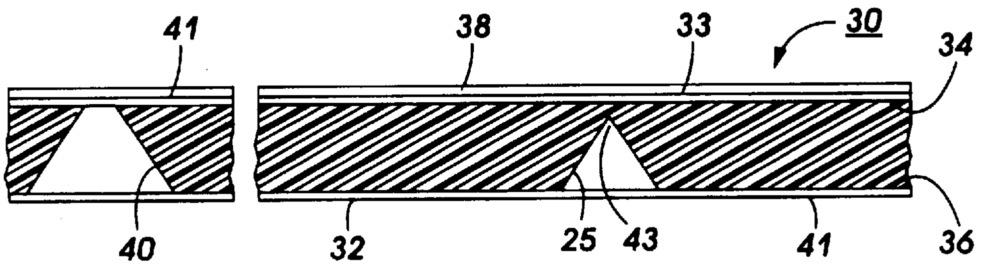
FIG. 3B is an enlarged cross-sectional view of the wafer of FIG. 2A as viewed along the line 3—3 thereof, showing an alignment opening and a recess which will later form the fill hole.

FIG. 2A shows a two-side-polished, (100) silicon wafer 30 used to produce a plurality of upper substrates 20 for printhead 10. FIG. 2B shows an enlarged view of one of the manifold recesses, and FIG. 20 shows an enlarged view of an alignment opening. After the wafer is chemically cleaned, a pyrolytic CVD silicon nitride layers 32, 33 (see FIG. 3) is deposited on both sides 34,36 of wafer 30. In addition, a layer 38 of a conductive metal, aluminum, in a preferred embodiment, is deposited over silicon nitride layer 33. Using conventional photolithography, a via for fill hole 26 (FIG. 2B) for each of the plurality of upper substrates 20 and, at least two vias for alignment opening 40 (FIG. 2C), at predetermined locations are printed on one wafer side 36, opposite the side shown in FIG. 2A The silicon nitride and aluminum is plasma etched off of the patterned vias representing the fill holes and alignment openings. A potassium hydroxide (KOH) anisotrophic etch is used to etch the fill holes and alignment openings.

Next, side 36 of wafer 30 is photolithographically patterned, using the previously etched alignment holes as a reference, to form the relatively large rectangular recesses 45 shown in FIG. 2B, that will eventually become the ink manifolds of the printheads. Also patterned are two recesses 46 between the manifolds in each substrate 20 and adjacent to each of the shorter walls 51 of the manifold recesses. Parallel elongated grooves 53 which are parallel and adjacent to each longer manifold recess wall 52 extend entirely across the wafer surface 34 and between the manifold recesses of adjacent substrates 20. The tops 47 of the walls delineating the manifold recesses are portions of the original wafer surface 34 that still contains the silicon layer overlain by the metal layer 38 and forms the streets 47 on which adhesive will be deposited in a uniform layer for bonding the wafers 30. The elongated grooves 53 and recesses 46 provide clearance for the printhead electrode terminals during the bonding process discussed later. One of the manifold recess walls 52 of each manifold will later contain grooves 48 which will serve as the ink channels. A KOH solution anisotropic etch is used to produce recess 45, but, because of the size of the surface pattern, the etching process must be timed to stop the depth of the recesses. Otherwise, the pattern size is so large that the etchant would etch entirely through the wafer. The floor 45*a* of the manifold recess 45 is determined at a depth where the etching process is stopped. This floor 45*a* is low enough to meet or slightly surpass the depth of the fill hole apex 43, so that an opening is produced that is suitable for use as the ink fill hole 26.

Figure 4:
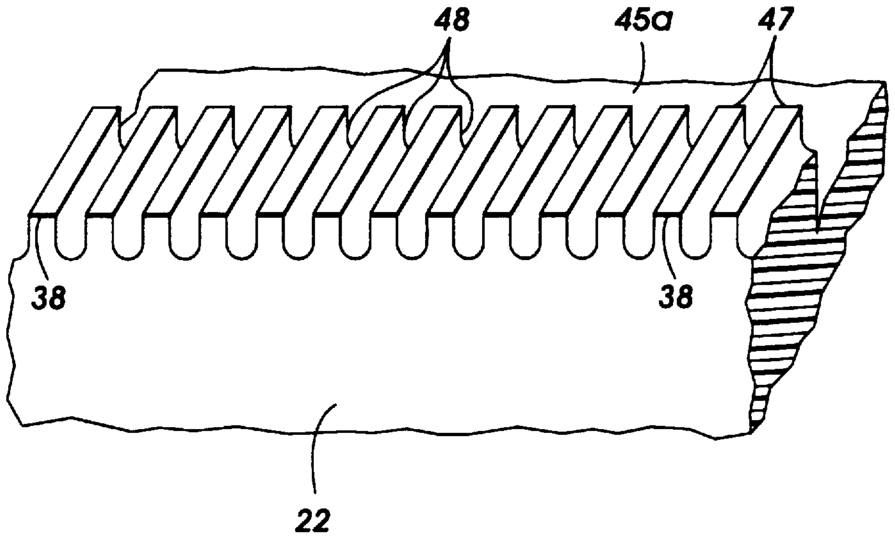
FIG. 4C is an enlarged isometric view of one set of channels which are later diced into one of the manifold recess walls of FIG. 2B.

Parallel grooves 48 (FIG. 4) are milled into a predetermined recess wall 52 by any dicing machine as is well known in the art. Each groove 48 is about 20 mils long and has a depth and width of about 1 mil. The grooves are separated by planar streets 47. The lineal spacing between axial centerlines of the grooves are about 3 mils. The streets 47 are covered by metal layer 38 and constitute the bonding surface. A coating of an adhesive is applied to layer 38 by an electrophoretic deposition process described herein.

Figure 5:
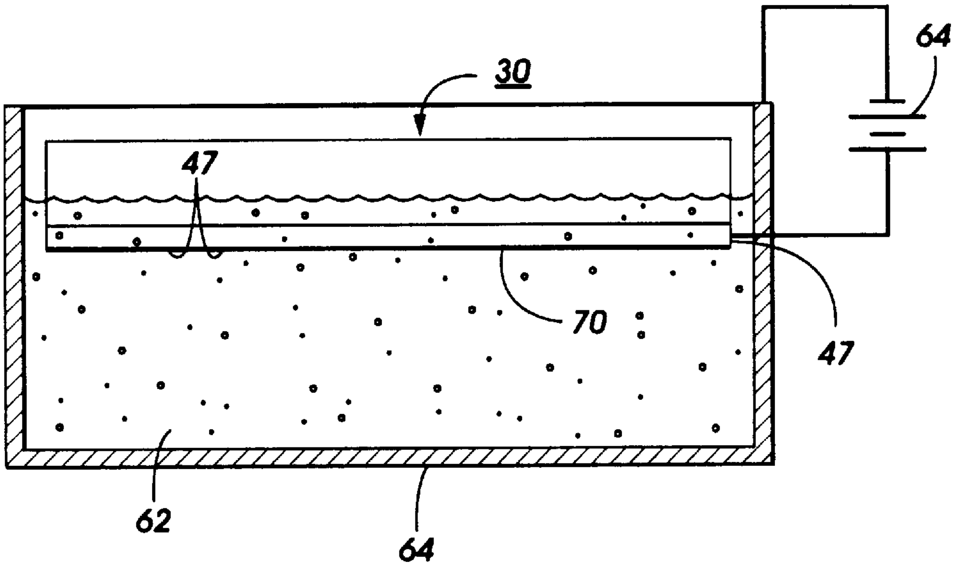
FIG. 5 shows an isometric view of the wafer of FIG. 2A placed in an electrophoretic bath consisting of a colloidal adhesive emulsion.

As described above, streets 47 have a metal (aluminum) surface layer 38 which is used as a bonding surface to which an adhesive is to be applied followed by a step bonding the channel plate to a heater plate to form printhead 10. Streets 47 are connected to a common strip which can be left as an exposed portion of metal layer 38. Referring to FIG. 5, a colloidal emulsion 62 of a polymer adhesive is contained within a container 64. Wafer 30 is lowered into solution 62 so that side 34, with streets 47, is fully submerged. An electrophoretic bath is formed with the container selected as either the anode or the cathode depending on the polymeric adhesive which was selected in the commonly connected streets 47 forming the second electrode. The two electrodes are then connected to a DC power supply 64. Under the influence of an applied field, the charged polymer micelles migrate towards and are deposited on the aluminum layer covering each street. Currents required for this type of deposition are in the order of 1 milliAmpere (mA) or less. In general, the lower the current, the more uniform the deposited coating. The field is applied for approximately 30±25 seconds to form a coating 70 of 1–2 microns.

The wafer 30 is then removed from the bath and aligned with the wafer containing a plurality of heater plates and bonded thereto as described more fully in U.S. Pat. Re. No. 32,572. The bonded substrates are then separated into a plurality of printheads 10.

The above-described electrophoretic coating is conducted at room temperature, provides very accurate deposition depending on control of electric field strength and permits use of a wide variety of adhesives. Suitable polymer adhesives include polysulfones, polyethersulfones, polyimides, polyamide-imides, epoxy resins, polyarylene ether ketones such as, chloromethylated polyarylene ether ketones, acryloylated polyarylene ether ketones, and mixtures thereof, preformed polyimides, polyetherimides, polystyrene, and the like and cholromethylated polyethersulfones and acryloylated polyethersulfones.

The patterning step provides a relatively precise definition of the conductive pattern edge and adhesive is deposited only up to the edges and should not flow into adjoining areas of the substrate when the bonding step is performed. For even greater accuracy, a second photolithographic patterning step can be performed to remove the edges of the metal pattern leaving only the central portions of the bonding pattern.

EXAMPLE I

A channel wafer 30 with required structural topography is metallized with aluminum by vacuum deposition on streets 47 and on 38, and then a thin coating of epoxy resin is formed as a 1 micron thick coating on 38 and 47 by the electrophoretic deposition of epoxy resin from a nonaqueous colloidal emulsion. For this specific embodiment, epoxy resin (Shell Epon 1009, 2 grams), triethylenetetramine (Aldrich, 2 grams), and cyclohexanone (40 mL) were heated at 85° C. for 4 hours, and the solution turned red. An additional 40 mL of cyclohexanone was added and the solution was allowed to cool to 25° C. The resultant solution was then added to methyl isobutyl ketone (280 mL) with magnetic stirring in a stainless steel beaker serving as the cathode. A colloidal emulsion was thus formed. An additional 560 mL cyclohexanone was added. The metallized wafer is immersed in the emulsion in an electric field of 25 volts applied for 10 seconds. The surface coating of an epoxy resin film was formed on the aluminum surface 38. After air-drying, the epoxy resin coated wafer was heated in an oven for 15 minutes at 50° C. to "B"-stage cure the film which was 1 micron thick. Afterwards, the metallized channel wafer and epoxy coating on 38 were mated and bonded to a heater wafer and heated to 150° C. at 10° C. per minute to permanently bond the heater and channel wafers. Following the dicing of the bonded channel and heater wafers into individual printheads, the printheads are immersed in ink and left in an oven at 50° C. for extended periods of time. The printheads were then taken out of the ink bath periodically, washed in a free-flowing stream of deionized water to rid the parts of the ink, and then the parts were carefully examined under a microscope for evidence of attack by the ink on the coating. The epoxy resin bond on 38 was tested in this way in alkaline ink comprising 7.5 percent by weight BASF Basacid Black X-34 dye, 10.5 percent by weight sulfolane, 15 percent by weight imidazole, 1 percent by weight imidazole hydrochloride, and 66 percent by weight water for 10 days at 50° C.; and, after this period, the coating was completely unaffected by the ink. "Y" curative, meta-phenylene diamine can be substituted for triethylenetetramine in the above formulation.

The anodic deposition has been found suitable for most of the polymeric adhesive materials listed supra with the exception of the polyarylene ether ketones for which the electric field polarity is reversed and positively charged micelle particles are deposited on the metalized wafer in a cathodic deposition process.

While the embodiment disclosed herein is preferred, it will be appreciated from this teaching that various alternative, modifications, variations or improvements therein may be made by those skilled in the art, which are intended to be encompassed by the following claims:

We claim:

1. A method for electrophoretic deposition of an adhesive coating to the surface of a first substrate to be bonded to the surface of a second substrate, comprising the steps of:

(a) forming a conductive layer on the surface of said first substrate, said layer comprising a first electrode, (b) forming a solution comprising colloidal particles of a polymer adhesive, (c) introducing said first electrode into the solution, (d) placing a second electrode in contact within said solution, (e) applying an electrical field across said first and second electrodes, (e) allowing a uniform adhesive coating of charged micelles of adhesive to be deposited on the conductive layer of said first substrate to a desired thickness, (f) removing the substrate from the solution and (g) bonding the first and second substrates, the bonding accomplished at the adhesive coating wherein the bonded first and second substrates form a plurality of ink passageways supplying ink to a plurality of liquid ink emitters.

2. The method of claim 1 wherein at least one of the substrates comprises an array of orifices for emitting a liquid.

3. The method of claim 1 wherein the first substrate is a channel plate for an ink jet printhead and further including the steps of:

(h) cleaning the substrate, (i) depositing an insulative layer on both surfaces of said first substrate prior to formation of said conductive layer, (j) photolithographically patterning the insulative layer on the side of the first substrate opposite the bonding pattern to produce at least one via therein for orientation dependent etching of at least one recess and (k) forming a plurality of equally spaced parallel grooves in said opposite surface, one end of the grooves connecting with the recess on the other end of the grooves left open.

4. The method of claim 3 wherein said second substrate is the heater plate for said printhead and including the further steps of:

(l) depositing a layer of insulating material on the first and second surfaces of the substrates, (m) forming an equally spaced, linear array of resistive material on the first surface of the second substrate for use as heating elements and forming a pattern of electrodes on the same substrate surface for enabling individual addressing of each heating element with current pulses, (n) aligning the first surface of the second substrate with the bonding surface of said first substrate so that the two aligned surfaces confront and contact each other, so that each groove contains a heating element therein spaced a predetermined distance from the groove open end and (o) curing the deposited adhesive to bond the first and second substrates together to form the printhead, wherein the recess serves as an ink supplying manifold, the grooves serve as capillary filled channels, and the groove open ends serve as the printhead nozzles.

5. A method for fabricating a printhead for use in an ink jet printing device, comprising the steps of:

(a) cleaning first and second silicon substrates, each having first and second parallel surfaces, (b) depositing a layer of insulating material on the surfaces of the substrates, (c) depositing a conductive layer on a first bonding surface of said second substrate, (d) forming an array of resistive material on the first surface of the first substrate for use as heating elements and forming a pattern of electrodes on the same substrate surface for enabling individual addressing of each heating element with current pulses, (e) photolithographically patterning the insulative layer on the second surface of the second substrate to produce at least one via therein for orientation dependent etching of at least one recess in the second substrate, (f) forming a plurality of grooves in the first surface of the second substrate, one end of the grooves communicating with the recess, (g) patterning the conductive layer to create a commonly connected conductive pattern, (h) electrophoretically depositing a polymeric adhesive over said conductive pattern, (i) aligning the first and second substrates with their first surfaces confronting and contacting each other, so that each groove contains a heating element therein, (j) curing the adhesive to bond the first and second substrates together to form the printhead, wherein the recess serves as an ink supplying manifold, the grooves serve as capillary filled channels and (k) cutting the bonded first and second substrates so as to intercept each of the grooves at their ends opposite their ends which communicate with the recess, thereby forming groove open ends which serve as the printhead nozzles.

* * * * *